United States Patent [19]
Kim

[11] Patent Number: 5,880,394
[45] Date of Patent: Mar. 9, 1999

[54] BALLISTIC GRILL FOR SPECIAL PURPOSE VEHICLES

[75] Inventor: Hyung Soo Kim, Gangsun Village, Rep. of Korea

[73] Assignee: Fried, Krupp AG Hoesch-Krupp, Essen, Germany

[21] Appl. No.: 933,665

[22] Filed: Sep. 19, 1997

Related U.S. Application Data

[63] Continuation-in-part of Ser. No. 805,618, Feb. 26, 1997, abandoned, which is a continuation-in-part of Ser. No. 615,491, Mar. 12, 1996, Pat. No. 5,641,933.

[30] Foreign Application Priority Data

Mar. 15, 1995 [KR] Rep. of Korea .................... 1995/5281

[51] Int. Cl.$^6$ ........................................................ F41H 7/04
[52] U.S. Cl. ........................ 89/36.02; 89/36.08; 298/188
[58] Field of Search ................ 89/36.02, 36.07, 89/36.08, 36.09, 36.14; 296/188, 189

[56] References Cited

U.S. PATENT DOCUMENTS

| | | | |
|---|---|---|---|
| 2,376,331 | 5/1945 | Abrams | 89/36.08 |
| 3,504,644 | 4/1970 | Schibisch | 109/49.5 |
| 4,325,283 | 4/1982 | Bemiss | 296/188 |
| 4,669,239 | 6/1987 | Maggs et al. | 109/49.5 |
| 5,405,673 | 4/1995 | Seibert | 89/36.02 |
| 5,452,641 | 9/1995 | Kariya | 89/36.02 |
| 5,641,933 | 6/1997 | Kim | 89/36.02 |

FOREIGN PATENT DOCUMENTS

| | | | |
|---|---|---|---|
| 2206754 | 8/1973 | Germany | 89/36.08 |

*Primary Examiner*—Stephen M. Johnson
*Attorney, Agent, or Firm*—Max Fogiel

[57] ABSTRACT

A ballistic beam used in special purpose vehicle in which a core with kinetic energy absorbing strength is positioned inside, and the outer shell with shock absorbing property surrounds entirely the core. The core is made of steel or other alloys of iron, other metal, metal alloys, cermets, ceramics, or combinations thereof that are either treated or untreated. The outer shell can be made of fabrics and is made of glass fiber, carbon, aramid, polyamid, polyester, polyethelene or hybrids of these materials. Bullets or splinters can be stopped effectively and cannot penetrate inside the vehicle. It is also possible to achieve minimized weight of the ballistic grill.

14 Claims, 3 Drawing Sheets

BALLISTIC GRILL FOR SPECIAL PURPOSE VEHICLES

BACKGROUND OF THE INVENTION

The present application is a continuation-in-part of the Parent application Ser. No. 805,618 filed Feb. 26, 1997 now abandoned which is a continuation-in-part of Ser. No. 08/615,491 filed Mar. 12, 1996 now U.S. Pat. No. 5,641,933.

The present invention concerns a ballistic grill used in special vehicles such as armored vehicles and especially a ballistic grill to protect a vehicle effectively from bullets and splinters with minimized weight.

Special vehicles usually have their engine compartments with cooling systems enclosed with a capsule member to prevent the vehicle from malfunctioning due to damage caused by penetration of a bullet or splinters. Normally, the essential air for combustion and cooling is supplied and removed through an inlet opening and an outlet opening.

Furthermore, the ballistic grills should be installed to cover inlet and outlet openings to prevent penetration of bullet into the engine compartment.

The requirement of a ballistic grill is to prevent penetration by bullets or splinters effectively, and to maximize air channels to cover necessary airflow with minimized weight for the entire system.

German Patent OS 37 03 716 uses a ballistic grill system as one of former technologies. In this patent, the ballistic grill includes several profile moldings manufactured with structural steel. And additional whole or partial profile parts are attached at the end of each profile moldings toward the vehicle at an angle aimed at preventing bullets or splinters.

In this kind of ballistic grill, since profile molding and profile parts are made mostly of steel, there is much possibility of creating splinters when it is hit by a bullet, and those splinters can penetrate. Sometimes, the bullet possibly penetrates the profile molding to reach the engine compartment.

Also, German Patent 4015 304 A1 discloses profile moldings made of a minimum of two individual profiles which create a hollow space. This hollow space can be filled with sandwich elements. An upper individual profile is made of metal or metal alloy with lower hardness and high elongation and a lower individual profile is made of metal or metal alloy with high hardness and lower elongation. Therefore, this can absorb the kinetic energy of a bullet, and a bullet that has penetrated through the upper profile can be caught in the hollow space. This type of grill improves the protection level by minimizing fragments.

However, in the preceding Korean Patent Application No. 91-7591, even though the upper profile is made of material with lower hardness and high elongation, it is made of metal basically and has limited capability in shock absorption and protection. Furthermore, there is difficulty in reducing the weight of the entire system, since both individual profiles are made of metal.

SUMMARY OF THE INVENTION

This invention has been done to solve many problems in former technologies of ballistic grills. The main object of this invention is to offer a ballistic grill for special purpose vehicles to prevent penetration of bullets or splinters effectively.

Another object of the present invention is to reduce the weight of a vehicle by offering a ballistic grill with minimized weight.

A further object of this invention is to offer and guarantee a ballistic grill with reliable functional operation.

A still further object of this invention is to provide a ballistic grill to protect the special purpose vehicle from enemy's radar and infra-red detection, in addition to basic functions.

These objects are achieved by providing a ballistic grill with many protection beams of several shapes.

The protection beams are made of a kinetic energy absorbing core entirely surrounded by a shock-absorbing outer shell. When the core as a plurality of sides, each of the sides is surrounded or covered by the shock-absorbing outer shell. The core is made of steel or other alloys of iron, other metal, metal alloys, cermets, ceramics, or combinations thereof and which are either treated or untreated.

The outer shell is made of fabrics, glass fiber, carbon, aramid, polyamid, polyester, polyethelene or hybrids of these materials.

According to the characteristics of the present invention, the core is entirely surrounded by an outer shell having shock-absorbing property. As a result, a bullet penetrating the outer shell will hit the core and create splinters which will make the outer shell bulge. Accordingly, all splinters will be trapped in between core and the outer shell. In case of penetration of the core, the outer shell of the other side will bulge to absorb the remaining kinetic energy of the bullet. Consequently, the penetration of the bullet and splinters to the inside of the vehicle can be stopped effectively. Furthermore, this system can contribute to reducing the weight of the ballistic grill, since the outer shell is made of light material.

According to another embodiment of this invention, the surface of the core can have specific shapes to strengthen the connection between the core and the outer shell.

In another embodiment of this invention, to improve the camouflage against radar and infra-red, additional material can be added on the surface of outer shell.

In a further embodiment of this invention, the connection of the core with outer shell can be solidly fixed or removable.

According to another embodiment of this invention, the outer shell consists of several sheets.

In another embodiment of this invention, there can be a slight hollow space between the core and the outer shell.

BRIEF DESCRIPTION OF THE DRAWINGS

The details of this invention for the preferred embodiments, based on attached drawings, are as follows: Same numbers have been used for same parts throughout all the drawings.

DESCRIPTION OF THE PREFERRED EMBODIMENTS

Figure 1:
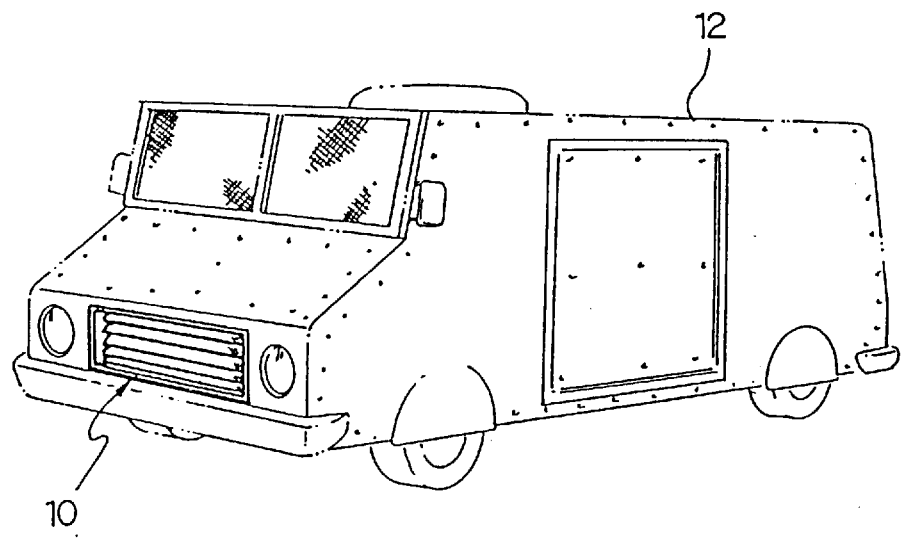
FIG. 1 is a perspective view of a special purpose vehicle with a ballistic grill.

FIG. 1 shows an embodiment of a special vehicle 12 with a ballistic grill 10. An engine compartment in the special vehicle 12 has an inlet opening and an outlet opening to supply necessary air for combustion and cooling and to remove used air.

Ballistic grills are installed on the inlet and outlet openings to offer air channel and to protect the vehicle from malfunctioning due to penetration of bullet or splinters.

Figure 2:
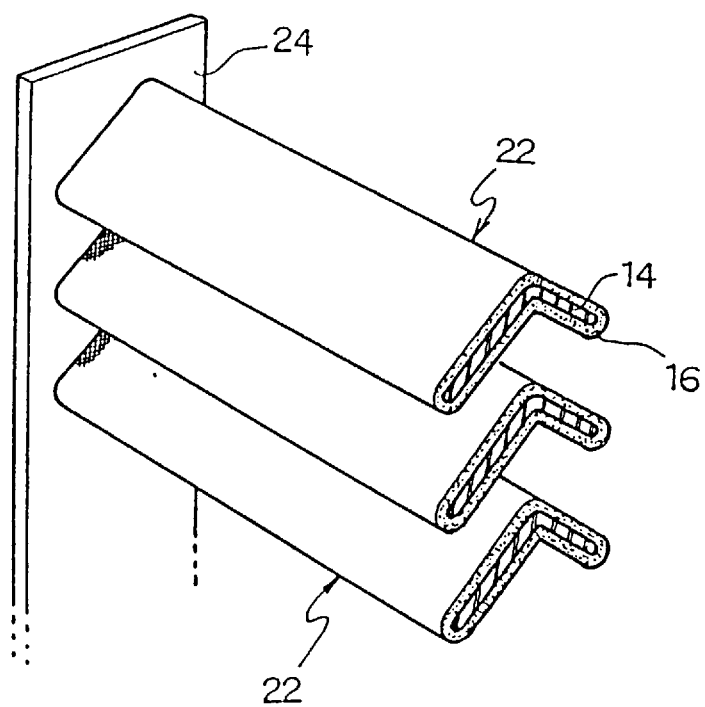
FIG. 2 is a partially enlarged perspective view of a grill for a special purpose vehicle.

As shown in FIG. 2, ballistic grill 10 in this invention includes several protection beams 22 and a support 24. Each beam 22 is fixed on the support 24 in a spaced manner by maintaining a fixed distance and with an angle to stop bullets or splinters. Protection beam 22 consists of the kinetic energy absorbing core 14 and an outer shell 16. The outer shell 16 surrounds the core 14 entirely through solid connection method. The core 14 is made of the material which has enough strength and hardness, for example, steel, alloys of iron, metal, metal alloy, cermet, ceramic, that are either treated or untreated. The outer shell (16) is made of the material which has shock-absorbing property, as for example, glass fiber, carbon, aramid, polyamid, polyester, polyethylene or hybrids of these materials.

Figure 3B:
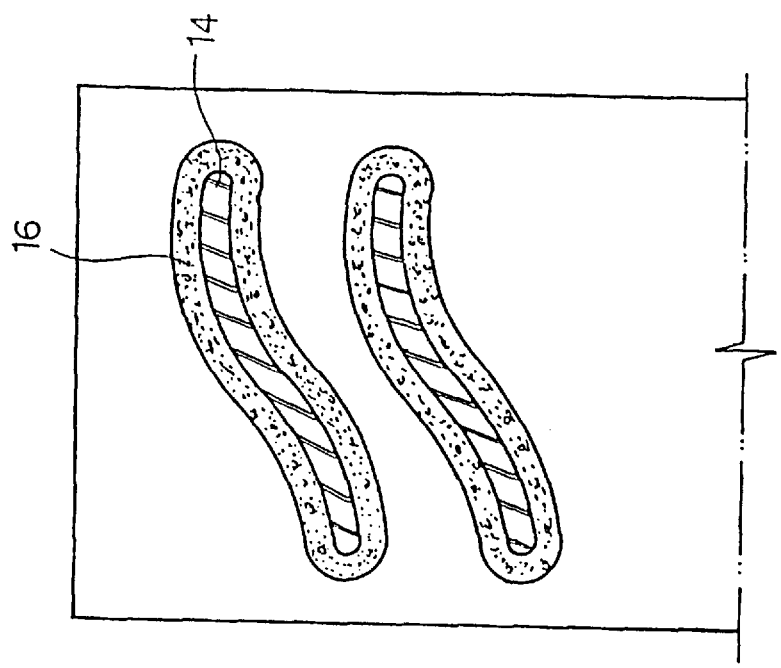
FIG. 3b is a sectional view of an S-shaped grill.
Figure 3A:
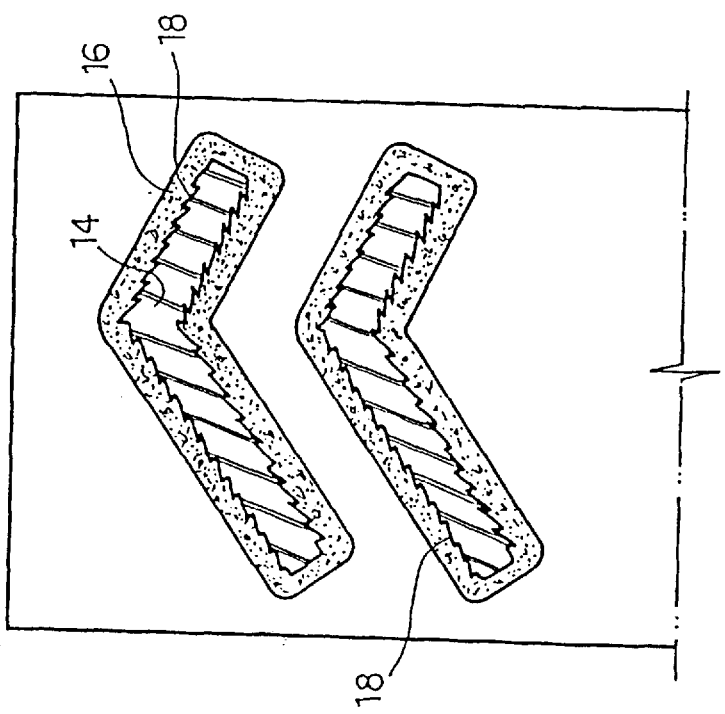
FIG. 3a is a sectional view of an L-shaped grill.
Figure 3C:
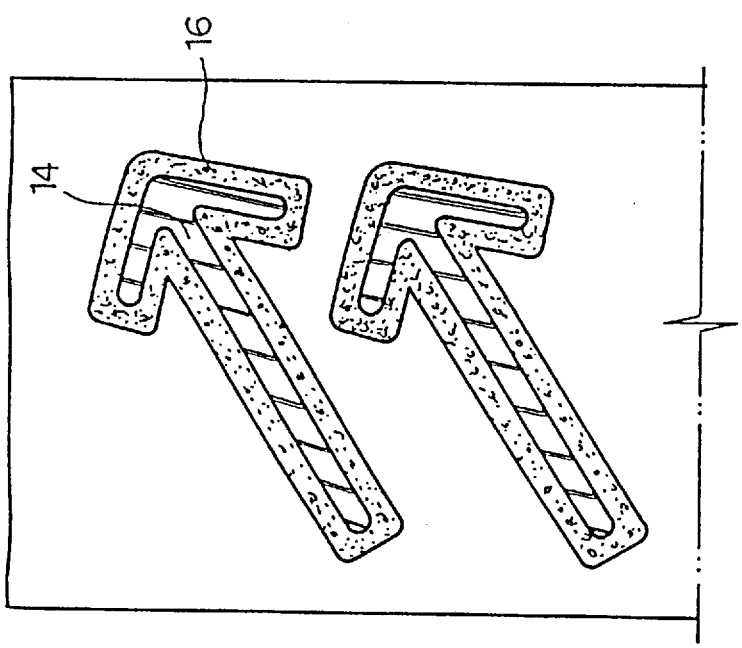
FIG. 3c is a sectional view of a T-shaped grill.

FIGS. 3a and 3b show various shapes of a ballistic grill. FIG. 3a shows an L type of ballistic grill. FIG. 3b shows an S type of ballistic grill. And FIG. 3c shows a T type ballistic grill. There can be a serrated area 18 on the surface of core 14 which can increase the connection with outer shell 16 (FIG. 3a) Consequently, this can minimize shifting of the outer shell at the time of impact by the bullet.

Figure 4:
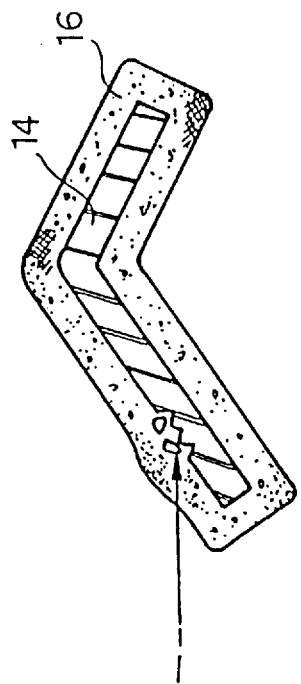
FIG. 4 is a sectional view showing absorption of kinetic energy of a bullet.

FIG. 4 shows the procedure of absorbing kinetic energy of the bullet briefly by the ballistic grill of this invention.

As the core 14 is made of hard material completely and surrounded with the outer shell 16, made of shock absorbing material, the bullet will penetrate the outer shell without creating any splinters and strike the core (14) which will absorb most of the kinetic energy. The bullet or splinters after impact will be reflected to outer directions which will make the outer shell 16 bulge and absorb the remaining kinetic energy of the bullet or splinters. Therefore, the bullet or splinters will stay in between the core 14 and the outer shell 16.

In the case of penetration through the core 14 due to high kinetic energy, the outer shell on the other side will bulge, and absorb the remaining kinetic energy.

In the case of penetration through the bulge due to very high kinetic energy, the bullet will hit the outer shell 16 of the next ballistic beam 22, because this bulge will not crack before it will touch the surface of the next outer shell, due to the size of the width of the airgaps. And the "defense procedure" starts again.

This behavior opens the possibility that due to the design, several ballistic beams can be used as kinetic energy absorber against one bullet without creating any splinters which can migrate in an air channel. Accordingly, with this invention, one can attain ballistic protection levels which cannot be achieved by all known grill systems including the aforementioned patents.

Figure 5:
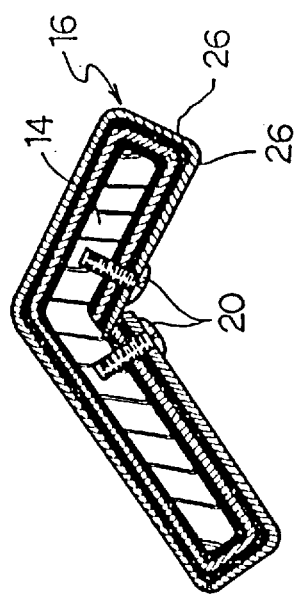
FIG. 5 is a sectional view showing connections between the core and the outer shell.

FIG. 5 shows connections of core 14 and the outer shell 16. The outer shell has several sheets 26. These sheets are detachably connected with the core 14 by bolts 20.

Therefore, as described, bullet and splinters can be stopped effectively from penetrating the engine compartment. Also, one can achieve the required protection with minimum weight of the system.

In accordance with the present invention, the outer shell can be or is made of fabrics. For this purpose, the fabrics may be made of the following materials:

Aramid fiber,

GFK glass fiber,

Polyester fiber.

These fabrics are used in different numbers and combinations for the grill profiles, depending on the requirements.

The fabrics are embedded in a matrix of PUR or EP, which is an epoxyresin.

The main fabrics are made of aramid which belongs to the family of aromatic polyamides, consisting of chain molecules of poly-p-phenyleneteraphthalamide forming long rigid chains (rigid rods).

A typical fabric can have the following properties and characteristics:

| | | |
|---|---|---|
| Density | g/cm$^3$ | 1.44 |
| Decomposition temperature | °C. | >500 |
| Tenacity | mN/tex | 1950 |
| | g/den | 22.1 |
| | MPa | 2800 |
| | MPA | 3150 |
| Initial modulus | N/tex | 55 |
| | G Pa | 80 |
| Elongation at break | % | 3.3 |
| Moisture regain (20° C., 65% rel. humidity) | % | ~4.5 |
| Heat resistance (retained strength) (48 h. 200° C.) | % | 90 |
| Hot air shrinkage (15 min. 190° C.) | % | <0.1 |
| Flammability | LOI-Index | 0.29 |
| Linear thermal expansion coefficient | 10$^{-6}$/K | -3.5 |
| Specific heat | J/kg K | 1420 |

The matrix can be additionally pigmented with materials for the purpose of reducing multi-spectral recognition.

In an embodiment with a required ballistic protection level of a grill system which requires a steel core of a weight of approximately 32 kg/m$^2$ one needs on each side of the steel core 1.6 kg/m$^2$ fabrics and 4.0 kg/m$^2$ resin as matrix material for the fabrics.

What is claimed is:

1. A ballistic grill for special purpose vehicles comprising: a plurality of parallel ballistic beams fixed onto a support in a spaced manner and at an angle so as to prevent penetration of bullets and splinters created from bullets striking the grill, wherein said ballistic beams have a kinetic energy absorbing core comprising at least one material selected from the group consisting of steel, alloys of iron, metals, metal alloys, cermets, ceramics, and an outer shell entirely surrounding said energy absorbing core, said outer shell comprising fabrics with fibers selected from the group consisting of glass, carbon, aramid, polyamide, polyester, and polyethylene.

2. A ballistic grill for special purpose vehicles as defined in claim 1, wherein said fabrics are selected from the group consisting of Aramid fiber, glass fiber, Polyester fiber.

3. A ballistic grill for special purpose vehicles as defined in claim 2, wherein said fabrics are of aramid belonging to the family of aromatic polyamides, consisting of chain molecules of poly-p-phenyleneteraphthalamide forming long rigid chains.

4. A ballistic grill for special purpose vehicles as defined in claim 1, wherein said fabrics are embedded in a matrix of polyurethane or epoxyresin.

5. A ballistic grill for special purpose vehicles as defined in claim 4, wherein said matrix is pigmented to reduce multi-spectral recognition.

6. A ballistic grill for special purpose vehicles as defined in claim 1, wherein said fabrics have the following properties:

| | | |
|---|---|---|
| Density | g/cm³ | 1.44 |
| Decomposition temperature | °C. | >500 |
| Tenacity | mN/tex | 1950 |
| | g/den | 22.1 |
| | MPa | 2800 |
| | MPA | 3150 |
| Initial modulus | N/tex | 55 |
| | G Pa | 80 |
| Elongation at break | % | 3.3 |
| Moisture regain (20° C., 65% rel. humidity) | % | ⁻4.5 |
| Heat resistance (retained strength) (48 h. 200° C.) | % | 90 |
| Hot air shrinkage (15 min. 190° C.) | % | <0.1 |
| Flammability | LOI-Index | 0.29 |
| Linear thermal expansion coefficient | 10⁻⁶/K | −3.5 |
| Specific heat | J/kg K | 1420. |

7. A ballistic grill as defined in claim 1, wherein said core has a serrated surface.

8. A ballistic grill as defined in claim 1, wherein said outer shell has a surface with additional materials thereon to improve camouflage against radar and infra-red detection.

9. A ballistic grill as defined in claim 1, wherein said core is connected to said surrounding outer shell by a fixed solid connection.

10. A ballistic grill as defined in claim 1, wherein said core is connected to said surrounding outer shell by a removable connection.

11. A ballistic grill as defined in claim 1, wherein said outer shell comprises a plurality of detachable sheets.

12. A ballistic grill as defined in claim 1, including a hollow space between said core and said outer shell.

13. A ballistic grill as defined in claim 1, wherein said core has a plurality of sides, each of said sides being surrounded by said outer shell.

14. A ballistic grill for special purpose vehicles comprising: a plurality of parallel ballistic beams fixed onto a support in a spaced manner and at an angle so as to prevent penetration of bullets and splinters created from bullets striking the grill, wherein said ballistic beams have a kinetic energy absorbing multi-sided core comprising at least one material selected from the group consisting of steel, alloys of iron, metals, metal alloys, cermets, ceramics, and an outer shell surrounding the sides of said energy absorbing core, said outer shell comprising fabrics with fibers selected from the group consisting of glass, carbon, aramid, polyamide, polyester, and polyethylene.

* * * * *